United States Patent Office 3,660,503
Patented May 2, 1972

3,660,503
PREPARATION OF PRIMARY ALCOHOLS
Herman S. Bloch, Skokie, and George R. Lester, Park Ridge, Ill., assignors to Universal Oil Products Company, Des Plaines, Ill.
No Drawing. Continuation-in-part of application Ser. No. 833,787, June 16, 1969, which is a continuation-in-part of application Ser. No. 579,499, Sept. 15, 1966. This application Aug. 18, 1970, Ser. No. 64,812
Int. Cl. C07c 31/02, 37/00
U.S. Cl. 260—617 H
11 Claims

ABSTRACT OF THE DISCLOSURE

Hydrocarbonaceous compounds such as n-paraffins, branched-chain paraffins, and certain cycloparaffins can be converted to primary alcohols by treatment with hydrogen peroxide as the sole hydroxylating agent in the presence of a catalyst containing a Group VIII metal such as nickel composited on kieselguhr. In this way n-pentane can be converted to 1-pentanol.

---

This application is a continuation-in-part of our copending application, Ser. No. 833,787, filed June 16, 1969 and now abandoned, which was a continuation-in-part of our copending application, Ser. No. 579,499, filed Sept. 15, 1966 and now abandoned.

This invention relates to a process for the production of alcohols and particularly to a novel method for the production of primary alcohols utilizing hydrocarbonaceous compounds as the starting materials.

The use of alcohols in the chemical industry is widely varied. For example, aliphatic alcohols such as those containing from 1 up to about 6 carbon atoms or more may be used as solvents for other organic chemicals. In addition, the alcohols are widely used in synthesizing other organic derivatives. Specific uses for some of these alcohols include the use of 1-pentanol as a raw material for certain pharmaceutical preparations and use in other organic syntheses. Another specific example is the use of 1-butanol in the preparation of esters such as butyl acetate, a solvent for resins and coatings, or dibutyl phthalate, a plasticizer, or esters useful as hydraulic fluids, etc. In addition, relatively long chain alcohols such as 1-tetradacanol may be used in organic synthesis, as a plasticizer, as antifoam agents and as a base for the manufacture of wetting agents and detergents.

It has now been discovered that alcohols, and particularly primary alcohols, may be prepared in a relatively inexpensive method utilizing hydrocarbonaceous compounds such as straight-chain or n-paraffins, branched-chain paraffins, or cycloparaffins containing at least one ethyl substituent at the starting materials in the process of this invention. Heretofore the prior art has disclosed certain methods of treatment with hydrogen peroxide or an oxygen-containing gas to effect a hydroxylation of hydrocarbonaceous compounds such as paraffins or olefins. However, the results which are obtained in these references are markedly different from those which are obtained by utilizing the compounds and conditions of the instant application. For example, one prior art reference discloses a process for treating hydrocarbonaceous compounds such as olefins in a free radical reaction utilizing hydrogen peroxide, said reaction being effected at a temperature above 400° C. and preferably from about 400° to about 650° C. This reference teaches that the energy utilized to extract the labile hydrogen is less than 90 kg. calories and preferably less than 85 kg. calories. However, in contradistinction to this the present invention is concerned with the preparation of primary alcohols in which the primary hydrogen atom on a compound has a bond energy of 98 kg. calories which is considerably in excess of that which is taught in the prior art.

Another prior art reference teaches the preparation of oxygenated hydrocarbons by treating a hydrocarbon in the liquid phase with oxygen, air, or other oxygen-containing gases using hydrogen peroxide as the oxidation initiator. This reaction is effected preferentially at temperatures ranging from about 93° to about 180° C. However, the alcohols which were obtained from this reaction are secondary or tertiary, and not predominantly primary in structure as are the products of this invention.

In addition, other references disclose hydroxylation reactions for obtaining compounds such as diols including glycols, etc., but do not disclose the preparation of primary monohydric alcohols.

As hereinbefore set forth, in contradistinction to the prior art, it has now been discovered that alcohols, and particularly primary alcohols, may be prepared according to the process hereinafter set forth in greater detail using hydrogen peroxide as the sole hydroxylating agent and in the absence of any free gaseous oxygen.

It is therefore an object of this invention to provide a novel method for the production of primary alcohols.

Another object of this invention is to provide a novel method for obtaining primary alcohols utilizing paraffinic hydrocarbons as the starting material.

In one aspect an embodiment of this invention is found in a process for the production of homologous predominantly primary alcohols which comprises treating a hydrocarbonaceous compound selected from the group consisting of n-paraffins, branched-chain paraffins, and cycloparaffins containing at least one ethyl substituent with stoichiometric amounts of hydrogen peroxide as the sole hydroxylating agent in the presence of a catalyst comprising a supported metal of Group VIII of the Periodic Table at reaction conditions including a temperature in the range of from about 150° to about 350° C. and a pressure in the range of from atmospheric to about 50 atmospheres, and recovering the resultant homologous primary alcohols.

A specific embodiment of this invention is found in a process for the production of alcohols which comprises treating n-pentane with hydrogen peroxide in the presence of a catalyst comprising nickel composited on kieselguhr at a temperature in the range of from about 150° to about 350° C. and at a pressure in the range of from atmospheric to about 50 atmospheres, and recovering the resultant 1-pentanol, 1-butanol, and 1-propanol.

Other objects and embodiments will be found in the following further detailed description of this invention.

As hereinbefore set forth, the present invention is concerned with a novel process for the production of alcohols, and particularly primary alcohols. In this respect we have now discovered that a hydrocarbonaceous compound which is saturated in nature and which contains only carbon and hydrogen atoms may be treated with a hydroxylating agent, and preferably hydrogen peroxide as the sole hydroxylating agent, at an elevated temperature to prepare the desired predominantly primary alcohols. Types of compounds which fall within the aforementioned definition will include n-paraffins, branched-chain paraffins, and cycloparaffins which contain at least one ethyl substituent on the saturated ring. The novelty of the present invention resides in the fact that, under the reaction conditions and with the catalysts which are employed and in the absence of any added free oxygen, methyl groups are selectively hydroxylated. Thus, if the hydrocarbonaceous compound which is utilized as the feed stock is a normal paraffin, 1-alkanols are produced exclusively. In addition, it is a further feature of our invention that selective scission of single carbon units occurs, with a resultant hydroxylation of the residue in a terminal position. Therefore, when using a normal paraffin, a series of homologous 1-alkanols is obtained. The distribution of the homologues which are obtained may be controlled by varying or regulating the temperature, pressure, feed rate, catalyst composition and other operating parameters.

Although the process of the present invention is primarily directed to the production of predominantly primary alcohols, and particularly 1-alkanols, it is possible to obtain secondary and tertiary hydroxylated compounds as the result of the successive scissions of carbon to carbon bonds before the remaining fragment is hydroxylated. For example, hydroxylation of toluene may produce, in addition to benzyl alcohol, the co-product phenol.

In the prefered embodiment of the invention, the hydrocarbonaceous compound which is to be partially oxidized to form the corresponding alcohol will comprise a paraffin, and particularly a normal paraffin, although it is also contemplated within the scope of this invention that other hydrocarbonaceous compounds such as the branched-chain aliphatic compounds, cycloaliphatic compounds containing at least one ethyl substituent on the ring, and alkyl aromatic compounds such as toluene, o-xylene, m-xylene, p-xylene, ethyl benzene, etc., said alkyl aromatic compounds being characterized by containing at least one methyl group on the ring, may be hydroxylated by treatment with the particular oxidizing agent to prepare primary alcohols therefrom.

The reaction conditions at which the hydrocarbonaceous compound containing at least one methyl group is treated with the hydroxylating agent will include elevated temperatures ranging from about 150° up to about 350° C. or more. In addition, the reaction is effected at pressures which will range from about atmospheric up to about 50 atmospheres or more. However, although the reaction may be carried out in either liquid or vapor phase, the particular pressure which is employed is preferably one which will maintain the reactants in vapor phase. If a superatmospheric pressure is required, it may be effected by charging an inert gas such as nitrogen to the reaction zone until the desired pressure has been reached.

Examples of hydrocarbonaceous compounds containing at least one methyl group and preferably paraffins which may be utilized as the starting material in the process of this invention include normal aliphatic hydrocarbons containing from 3 up to about 18 carbon atoms such as propane, n-butane, n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane; branched-chain paraffinic hydrocarbons containing from 4 up to about 18 carbon atoms such as isobutane, isopentane, isohexane, 2,3-dimethyl pentane, 2,4-dimethyl pentane, 2-methyl hexane, 2,4-dimethyl hexane, 2,4,4-trimethyl hexane, 2-methyl octane, 2,4-dimethyl octane, 2,4,4-trimethyl octane, 2-methyl nonane, 2,4-dimethyl nonane, 3,5-dimethyl nonane, 2,5,5-trimethyl nonane, 2-methyl decane, 2,5-dimethyl decane, 2,5,5-trimethyl decane, 2-methyl-5-ethyl decane, 2-methyl undecane, 4-ethyl undecane, 2,4,4-trimethyl undecane, 2 - methyl dodecane, 2,4,4-trimethyl dodecane, 2-methyl tridecane, 2-methyl-4-ethyl tridecane, 2-methyl tetradecane, 2,4,4-trimethyl tetradecane, 2-methyl pentadecane, 2-methyl-5-ethyl pentadecane, the isomeric and alkyl substituted hexadecanes, heptadecanes, etc.; cycloparaffins containing at least one ethyl substituent such as ethylcyclopentane, ethylcyclohexane, ethylcycloheptane, 1-methyl-2-ethylcyclopentane, 1,2-diethylcyclopentane, 1,3-diethylcyclopentane, 1,2-diethylcyclohexane, 1,3-diethylcyclohexane, 1,4-diethylcyclohexane, 1-ethyldecahydronaphthalene, etc. It is to be understood that the aforementioned hydrocarbonaceous compounds are only representative of the classes of compounds which may undergo hydroxylation, and that the present invention is not necessarily limited thereto.

In the preferred embodiment of the invention, the alcohols are produced by treating the hydrocarbonaceous compound with a hydroxylating agent in the absence of any added free oxygen and in the presence of a catalytic composition of matter, said catalytic composition of matter comprising a solid catalyst containing a metal of Group VIII of the Periodic Table, preferably composited on a solid support. Of the metals of Group VIII of the Periodic Table, the particularly effective catalysts comprise nickel composited on kieselguhr, nickel composited on alumina, nickel composited on silica, rhodium composited on kieselguhr, rhodium composited on alumina, rhodium composited on silica, etc. Other metals of Group VIII of the Periodic Table composited on solid supports which may be used include platinum composited on kieselguhr, platinum composited on alumina, platinum composited on silica, palladium, ruthenium, osmium, iriduim, iron, or cobalt all composited on one of the aforementioned solid supports.

The sole hydroxylating agent which may be used preferably comprises hydrogen peroxide. For convenience and safety the hydrogen peroxide in stoichiometric amounts may be fed to the reaction system in an aqueous solution which may contain from about 30% up to about 90% hydrogen peroxide.

The aforementioned hydrogen peroxide is present in a mole ratio in the range of from about 0.01:1 to about 1:1, and preferably in a range of from about 0.05:1 to about 0.25:1 mole of hydrogen peroxide per mole of hydrocarbon. It is contemplated within the scope of this invention that other hydroxylating agents such as aqueous sodium or calcium hypochlorite, etc., may also be used although not necessarily with equivalent results.

The process of this invention may be effected in any suitable manner and may comprise either a batch or continuous type of operation. In the preferred embodiment of said invention the process is effected in a continuous manner. An appropriate reaction vessel is maintained at the proper operating conditions of temperature and pressure, said vessel containing the desired catalyst such as nickel composited on kieselguhr. The hydrocarbonaceous compound to be treated is continuously charged to the reaction vessel as is the sole hydroxylating agent such as hydrogen peroxide, said reaction being effected in the absence of any added free oxygen. In addition, if so desired, a stream of inert gas such as nitrogen is also introduced into the vessel in order to maintain the proper pressure. After completion of the desired residence time, the reaction mixture is continuously withdrawn and separated by conventional means such as, for example, phase separation and/or fractional distillation under reduced pressure, whereby the desired alcohols are separated from unreacted charge stock and oxidizing agent, the latter two being recycled to form a portion of the feed stock. The alcohols may then be further separated into the desired fractions.

One particular type of continuous operation which may be used comprises the fixed bed type of operation in which the catalyst is disposed as a fixed bed in the reaction vessel while the charge stock and the oxidizing agent are passed in either an upward or downward flow through the bed of said catalyst. It is also contemplated within the scope of this invention that a moving bed type of operation may be used in which the catalyst bed and the reactants pass either concurrently or countercurrently to each other. Yet another type of operation which may be used comprises the slurry type operation in which the catalyst is carried into the reaction vessel as a slurry in the charge stock.

Examples of alcohols which may be prepared according to the process of this invention comprise primary alcohols such as methanol, ethanol, n-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 2-cyclopentylethanol, cyclopentylcarbinol, 2-cyclohexylethanol, cyclohexylcarbinol, etc.

The following examples are given to ilustrate the process of the present invention which, however, are not intended to limit the generally broad scope of the present invention in strict accordance therewith.

EXAMPLE I

In this experiment, a reaction vessel containing a catalyst comprising nickel composited on kieselguhr was heated to a temperature of about 315° C. A stream of nitrogen was mixed with n-pentane and charged to the reaction vessel. In addition, hydrogen peroxide as the sole hydroxylating agent was also charged to the reactor by saturation of the nitrogen with a 30% aqueous solution of $H_2O_2$, said hydrogen peroxide being added in a molar ratio of 0.1 mole of $H_2O_2$ per mole of n-pentane. The reaction mixture was withdrawn and was subjected to fractional distillation, the desired products, comprising about a 50% combined yield of 1-pentanol, 1-butanol, and 1-propanol, being recovered.

EXAMPLE II

A reaction vessel containing a catalyst comprising nickel composited on silica is heated to a temperature of about 200° C. Following this, a charge stock comprising butane is charged thereto along with nitrogen gas. In addition, a hydroxylating agent consisting solely of hydrogen peroxide in a mole ratio of 0.1 mole of $H_2O_2$ per mole of butane is also charged thereto. After passage through the reaction vessel and over the catalyst bed, the reactor effluent is withdrawn and subjected to fractional distillation. The desired products comprising about a 50% combined yield 1-butanol, 1-propanol, and ethanol are recovered.

EXAMPLE III

A reaction vessel containing a catalyst comprising nickel composited on alumina is heated to a temperature of about 200° C. A stream of nitrogen is thereafter charged to the reaction vessel while the charge stock comprising n-heptane in the stream of nitrogen is charged thereto. The sole hydroxylating agent consisting of hydrogen peroxide in an amount of about 0.1 mole of $H_2O_2$ per mole of n-heptane is also charged to the reactor through separate means. Following passage over the catalyst bed, the reactor effluent is withdrawn and subjected to fractional distillation under reduced pressure, the desired product comprising a 50% yield consisting of a mixture of 1-heptanol, 1-hexanol, and 1-pentanol being recovered.

EXAMPLE IV

To a reactor containing a catalyst containing nickel composited on kieselguhr is charged a stream of n-decane. In addition, a hydroxylating agent consisting of a 30% hydrogen peroxide solution in a mole ratio of 0.1 mole of $H_2O_2$ per mole of n-decane is charged through a separate line and the reactor thereafter heated to a temperature of 250° C. After passage through the reactor and over the catalyst bed, the reaction effluent is withdrawn. The effluent is subjected to fractional distillation under reduced pressure and the desired product comprising about a 50% yield of a mixture of 1-decanol, 1-nonanol, and 1-octanol is recovered.

EXAMPLE V

A charge stock comprising n-tetradecane is treated in a manner similar to that set forth in the above example by passage over a catalyst comprising nickel composited on kieselguhr at a temperature of about 250° C. The desired product comprising a mixture of 1-tetradecanol, 1-tridecanol, and 1-dodecanol is separated from the reactor effluent and recovered.

EXAMPLE VI

A catalyst comprising rhodium composited on lithiated alumina was prepared by the following procedure: 15 g. of lithium nitrate were dissolved in 600 cc. of water. The resulting solution was poured over 300 g. of a calcined alumina and dried in a rotary evaporator. Following this, the mixture was calcined in a muffle furnace for 2 hours at 540° C. A solution was prepared by adding 6.5 g. of rhodium chloride hydrate and 13.7 cc. of concentrated hydrochloric acid to 66 cc. of water. The solution was poured over the lithiated base, the mixture dried in a rotary evaporator, and the product calcined in a 20% steam in air stream for 6 hours at 510° C.

The catalyst prepared according to the above paragraph was loaded in a reactor and thereafter the catalyst was reduced in a stream of hydrogen for 2 hours at 550° C. After the reduction, a stream of helium was used as a carrier gas for n-pentane which was charged to the reaction vessel. In addition, the sole hydroxylating agent comprising hydrogen peroxide in a mole ratio of about 0.1 mole of $H_2O_2$ per mole of n-pentanol was also charged to the reactor, said reactor being maintained at a temperature of 282° C. At the end of the flow through, the reaction mixture was recovered and subjected to fractional distillation, the desired products comprising about a 50% yield of a mixture of 1-pentanol, 1-butanol, and 1-propanol being recovered.

EXAMPLE VII

In this example, a catalyst is prepared according to the method set forth in Example VI above and placed in a reaction vessel. After reducing the catalyst, the charge stock comprising ethylcyclopentane is charged to the reaction vessel which is heated to a temperature of about 250° C. In addition, the sole hydroxylating agent consisting of hydrogen peroxide in an amount of about 0.1 mole of $H_2O_2$ per mole of ethylcyclopentane in a nitrogen stream is also charged to the reactor. The reaction mixture is withdrawn and subjected to fractional distillation, the desired products comprising about a 50% yield of a mixture of 2-cyclopentylethanol and cyclopentyl carbinol are recovered.

EXAMPLE VIII

A catalyst comprising platinum composited on alumina is prepared by a manner similar to that set forth in Example VI above. Following this, the catalyst is placed in an appropriate reaction vessel and a stream of n-decane is charged to said vessel. In addition, the sole hydroxylating agent consisting of 30% hydrogen peroxide in a mole ratio of 0.1 mole of $H_2O_2$ per mole of n-decane is also charged thereto. After admixture of the oxidizing agent and the hydrocarbon charge stock and after passage through the reaction vessel and over the catalyst bed, the reactor effluent is withdrawn and subjected to fractional distillation. The desired products comprising a 50% yield of a mixture of 1-decanol, 1-nonanol, and 1-octanol are recovered therefrom.

We claim as our invention:

1. A process for the production of homologous predominantly primary alcohols which comprises treating a hydrocarbonaceous compound selected from the group consisting of n-paraffins, branched-chain paraffins, and cycloparaffins containing at least one ethyl substituent with stoichiometric amounts of hydrogen peroxide as the sole hydroxylating agent in the presence of a catalyst comprising a supported metal of Group VIII of the Periodic Table at a temperature in the range of from about 150° to about 350° C. and a pressure in the range of from atmospheric to about 50 atmospheres, and recovering the resultant homologous primary alcohols.

2. The process as set forth in claim 1 in which said catalyst comprises a supported nickel.

3. The process as set forth in claim 1 in which said catalyst comprises a supported rhodium.

4. Thep rocess as set forth in claim 2 in which said catalyst comprises nickel composited with kieselguhr.

5. The process as set forth in claim 2 in which said catalyst comprises nickel composited with alumina.

6. The process as set forth in claim 3 in which said catalyst comprises rhodium composited with kieselguhr.

7. The process as set forth in claim 3 in which said catalyst comprises rhodium composited with alumina.

8. The process as set forth in claim 1 in which said hydrocarbanaceous compound comprises n-butane and said primary alcohols comprise 1-butanol, 1-propanol, and ethanol.

9. The process as set forth in claim 1 in which said hydrocarbonaceous compound comprises n-heptane and said primary alcohols comprise 1-heptanol, 1-hexanol, and 1-pentanol.

10. The process as set forth in claim 1 in which said hydrocarbonaceous compound comprises n-decane and said primary alcohols comprise 1-decanol, 1-nonanol, and 1-octanol.

11. The process as set forth in claim 1 in which said hydrocarbonaceous compound comprises ethylcyclopentane and said primary alcohols comprise 2-cyclopentylethanol and cyclopentylcarbinol.

References Cited

UNITED STATES PATENTS 2,410,642  11/1946  Farkas _____ 260—632 C
2,818,441  12/1957  Vaughan et al. ____ 260—632 C HOWARD T. MARS, Primary Examiner U.S. Cl. X.R.

260—618 C, 632 C